United States Patent [19]
Pittel et al.

[11] Patent Number: 5,861,050
[45] Date of Patent: Jan. 19, 1999

[54] THERMALLY-MANAGED FUEL VAPOR RECOVERY CANISTER

[75] Inventors: Alan Pittel, Hartland, Mich.; Alexander P. Rafalovich, Indianapolis, Ind.; John D. Cathcart, Lake Orion, Mich.

[73] Assignee: Store Heat and Produce Energy, Inc., Indianapolis, Ind.

[21] Appl. No.: 745,334

[22] Filed: Nov. 8, 1996

[51] Int. Cl.⁶ .................................................. B01D 53/04
[52] U.S. Cl. ................... 95/115; 95/143; 95/146; 96/137; 96/139; 96/144; 96/146; 96/149; 96/152; 123/519
[58] Field of Search .................. 95/114, 115, 141, 95/143, 146; 96/108, 126, 130, 137–146, 149, 152; 123/519–521

[56] References Cited

U.S. PATENT DOCUMENTS

| | | | |
|---|---|---|---|
| 1,737,822 | 12/1929 | Barnebey | 96/145 |
| 3,528,224 | 9/1970 | Warn | 96/126 |
| 3,626,671 | 12/1971 | Ebeling, Jr. | 96/126 |
| 3,734,293 | 5/1973 | Biskis | 96/126 X |
| 3,850,592 | 11/1974 | Huffman | 96/126 X |
| 4,026,680 | 5/1977 | Collins | 96/126 X |
| 4,272,390 | 6/1981 | Lane et al. | 252/70 |
| 4,272,391 | 6/1981 | Lane et al. | 252/70 |
| 4,272,392 | 6/1981 | Lane et al. | 252/70 |
| 4,273,666 | 6/1981 | Lane et al. | 252/70 |
| 4,283,298 | 8/1981 | Lane et al. | 252/70 |
| 4,329,242 | 5/1982 | Lane et al. | 252/70 |
| 4,338,208 | 7/1982 | Lane et al. | 252/70 |
| 4,402,846 | 9/1983 | Lane et al. | 252/70 |
| 4,412,931 | 11/1983 | Lane et al. | 252/70 |
| 4,444,727 | 4/1984 | Yanagihara et al. | 96/126 X |
| 4,581,049 | 4/1986 | Januschkowetz | 96/126 |
| 4,585,572 | 4/1986 | Lane et al. | 252/70 |
| 4,613,444 | 9/1986 | Lane et al. | 252/70 |
| 4,637,888 | 1/1987 | Lane et al. | 252/70 |
| 4,690,769 | 9/1987 | Lane et al. | 252/70 |
| 4,869,739 | 9/1989 | Kanome et al. | 123/519 X |
| 4,954,146 | 9/1990 | Garrett et al. | 96/126 X |
| 5,143,041 | 9/1992 | Franzke | 123/520 |
| 5,156,178 | 10/1992 | Harris | 137/43 |
| 5,194,075 | 3/1993 | Matsuoka | 55/195 |
| 5,207,808 | 5/1993 | Haruta et al. | 55/316 |
| 5,209,210 | 5/1993 | Ikeda et al. | 123/520 |
| 5,235,955 | 8/1993 | Osaki | 123/520 |
| 5,268,022 | 12/1993 | Garrett et al. | 96/126 X |
| 5,271,029 | 12/1993 | Seiffarth et al. | 372/64 |
| 5,272,873 | 12/1993 | Hamazaki | 60/283 |
| 5,299,545 | 4/1994 | Kuroda et al. | 123/520 |
| 5,305,807 | 4/1994 | Healy | 141/59 |
| 5,398,513 | 3/1995 | Klobucar | 96/146 X |

FOREIGN PATENT DOCUMENTS

| | | | |
|---|---|---|---|
| 0468665 | 1/1992 | European Pat. Off. | 96/143 |
| 54-125179 | 9/1979 | Japan | 96/126 |
| 55-039208 | 3/1980 | Japan | 96/108 |
| 55-092122 | 7/1980 | Japan | 96/126 |
| 58-153029 | 9/1983 | Japan | 96/126 |
| 60-129116 | 7/1985 | Japan | 96/126 |
| 62-123001 | 6/1987 | Japan | 96/126 |
| 4-087616 | 3/1992 | Japan | 96/126 |
| 4-148194 | 5/1992 | Japan | 96/108 |
| 4-290513 | 10/1992 | Japan | 96/126 |

OTHER PUBLICATIONS

Jones, J.A. and Yavrouian, A.H., "Activated–Carbon Sorbent With Integral Heat–Transfer Device", NASA Tech Brief vol. 20, No. 6, Item #73 from JPL New Technology Report NPO–18802 (Jun., 1996). Jet Propulsion Laboratory, California Institute Of Technology, Pasadena, California.

Primary Examiner—Robert Spitzer
Attorney, Agent, or Firm—Woodard, Emhardt, Naughton, Moriarty & McNett

[57] ABSTRACT

Described are preferred vapor recovery canisters which are useful in on-board vehicle fuel vapor recovery systems. The preferred canisters incorporate thermal management of solid adsorbent with phase change materials to improve both adsorptive and desorptive capacity of the canisters. Also described are preferred encapsulation members for use in the vapor recovery canisters.

23 Claims, 5 Drawing Sheets

THERMALLY-MANAGED FUEL VAPOR RECOVERY CANISTER

BACKGROUND

The present invention relates generally to vapor recovery canisters and in particular to on-board fuel vapor recovery canisters incorporating means for thermal management of a solid adsorbent during fueling and purging cycles so as to increase the respective adsorptive and desorptive capacities of the canister during such cycles.

As further background, during vehicle refueling operations, fuel vapor is displaced from the fuel tank by entering fuel. To prevent the displaced fuel vapors from entering the atmosphere, they are typically adsorbed in a vapor recovery canister. Such canisters are fluidly coupled to the fuel tank, and receive the fuel vapors as they are displaced. An adsorbent material contained within the canister adsorbs the fuel vapors, and a cleansed gas stream exits the canister. After the fueling operation, the adsorbent is loaded with fuel vapor, which can be desorbed as a vapor in a purge cycle and recovered for later combustion. A variety of such systems have been proposed, and for additional general background on vapor recovery systems, reference can be made for example to U.S. Pat. Nos. 5,272,873; 5,299,545; 5,235,955; 5,207,808; 5,143,041; 5,209,210; 5,156,178; 5,194,075; and 5,305,807.

The process of fuel vapor adsorption involves the condensation of the vapor on the surface of the solid adsorbent, an operation which produces heat. This compromises the efficiency of adsorption as fueling progresses because the efficiency of vapor condensation decreases with increasing adsorbent temperature. One way to address this problem might be to increase the amount of solid adsorbent in the canister. Unfortunately, this necessitates an increase in the size of the overall canister device, a result desirably avoided. Moreover, during purge operations, the passage of a gas such as ambient air through the adsorbent bed causes cooling of the bed, leading to a concomitant decrease in desorption efficiency. To address this problem, the purge gas might be heated; however, such a measure involves increased investment in both equipment and energy, and is preferably also avoided.

In light of this background there exist needs for improved vapor recovery canisters and methods which increase vapor recovery capacity without the need to increase the amount of solid adsorbent. An improved vapor recovery canister and method would desirably both increase loading capacity during a fueling operation and facilitate the removal of fuel as a vapor during a purge cycle. The present invention addresses these needs.

SUMMARY OF THE INVENTION

Accordingly, one preferred embodiment of the present invention provides a vapor recovery canister for adsorbing fuel vapor which includes a container having an inlet opening and an outlet opening at spaced positions from one another, for passing a gaseous stream through the container. An adsorbent for adsorbing fuel vapor is contained in the container and arranged to adsorb fuel vapor from the gaseous stream as it passes through the container. The canister of the invention also includes an (i.e. at least one) encapsulation and a phase change material hermetically contained in the encapsulation, wherein the encapsulation is in heat exchange relationship with the solid adsorbent. In this manner, heat which is generated during adsorption of fuel vapor is removed from the adsorbent by the encapsulated phase change material, and rejected back to the adsorbent during desorption of the fuel from the adsorbent (e.g. during a purge cycle). Thus, the adsorptive and desorptive capacities of the adsorbent during respective fueling and purging cycles are improved.

Another preferred embodiment of the invention provides a method for controlling fuel vapors displaced during a fueling operation. The process comprises the step of adsorbing the fuel vapors on a solid adsorbent in heat exchange relationship with an encapsulation hermetically containing a phase change material, wherein heat generated by the adsorption of fuel vapors is transferred to the phase change material.

Another preferred embodiment of the invention provides an encapsulation of a phase change material for use in a vapor recovery canister. The encapsulation includes a wall member having an internal passage, and a plurality of hollow elongate members attached to the wall member. The interior of each of the hollow elongate members is fluidly coupled to the internal passage of the wall member, which further defines a fill port communicating with the internal passage. A phase change material is contained in the hollow elongate members.

Still another preferred embodiment of the present invention provides a fuel holding and vapor control system which comprises a fuel tank, and a vapor recovery canister fluidly coupled to the fuel tank so as to receive fuel vapors displaced from the fuel tank during filling of the tank with fuel. In accordance with the invention the canister contains a solid adsorbent material and an encapsulation containing a phase change material in heat exchange relationship with the adsorbent material.

The invention provides devices and methods which improve the efficiency of fuel vapor adsorption on a solid adsorbent by thermal management of the adsorbent with a phase change material. The devices and methods of the invention also involve the rejection of heat by the phase change material to improve desorption or purging of the fuel from the adsorbent as a vapor which can be returned to the tank or taken directly to combustion. Additional objects, features and advantages of the invention will be apparent from the following description.

DESCRIPTION OF THE PREFERRED EMBODIMENTS

For the purpose of promoting an understanding of the principles of the invention, reference will now be made to certain embodiments and specific language will be used to describe the same. It will nevertheless be understood that no limitation of the scope of the invention is thereby intended, such alterations, further modifications and such applications of the principles of the invention as illustrated herein being contemplated as would normally occur to one skilled in the art to which the invention pertains.

Figure 1:
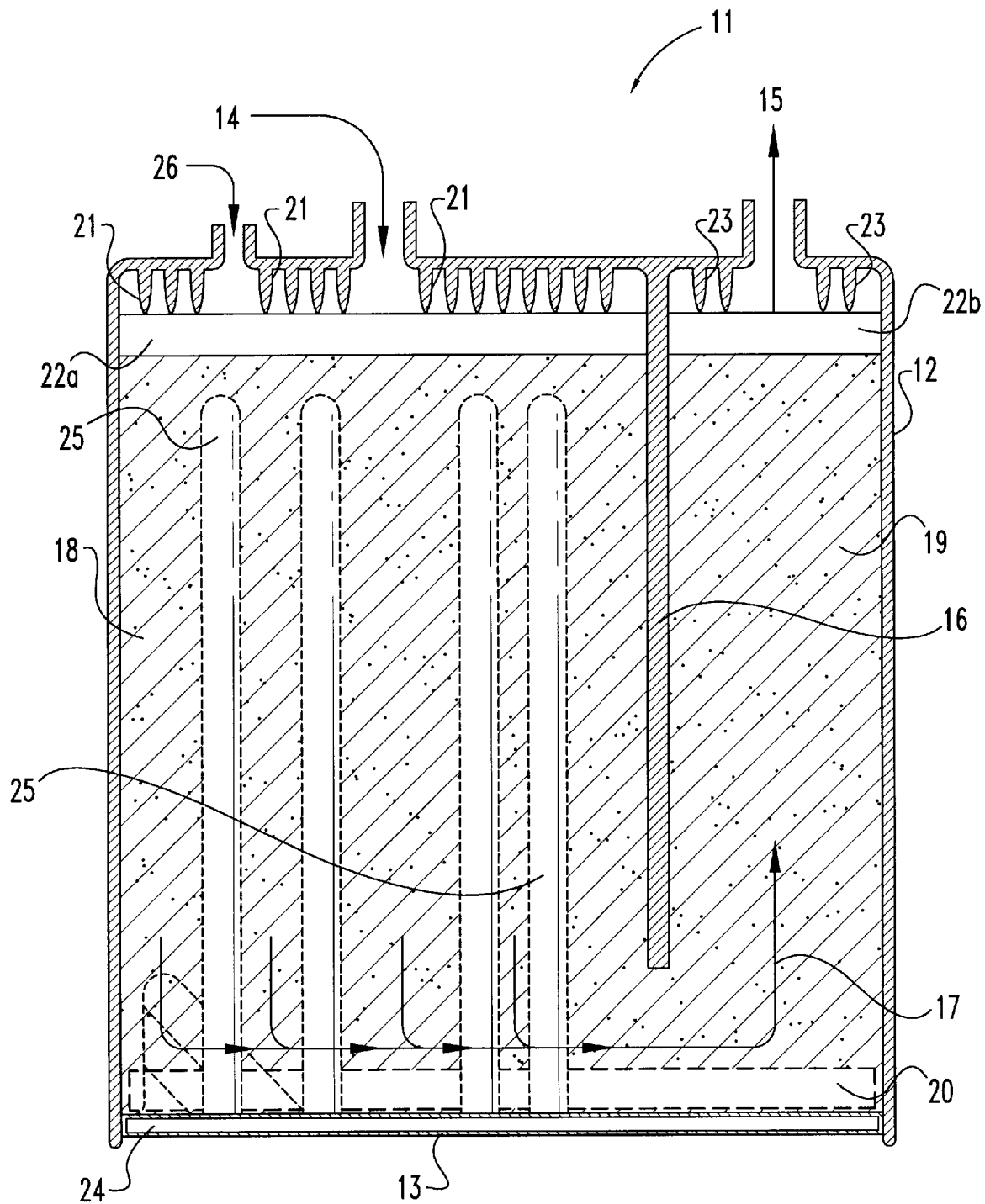
FIG. 1 is a cross sectional view of a vapor recovery canister in accordance with the invention.
Figure 2:
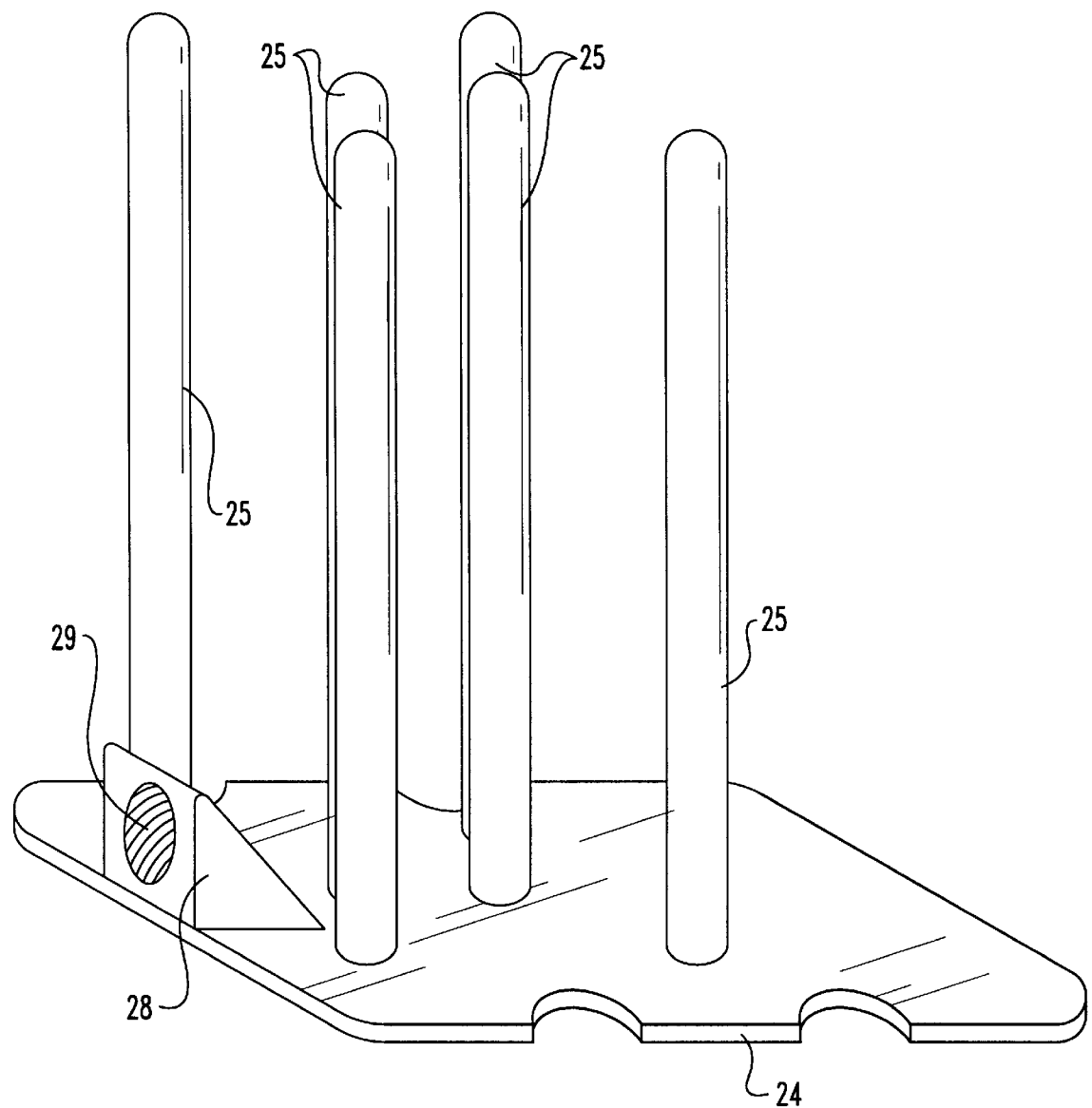
FIG. 2 is a perspective view of an insert for a vapor recovery canister including an encapsulation for a phase change material.
Figure 4:
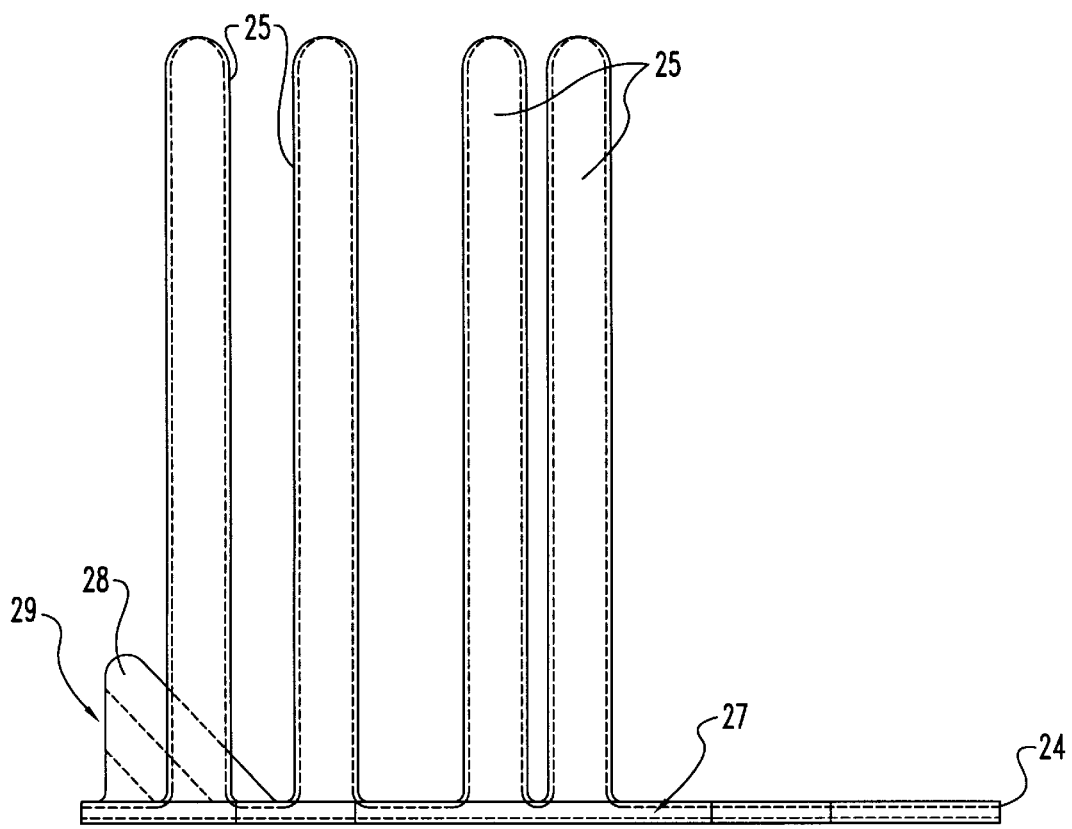
FIG. 4 is a plan view of the insert of FIG. 3.
Figure 3:
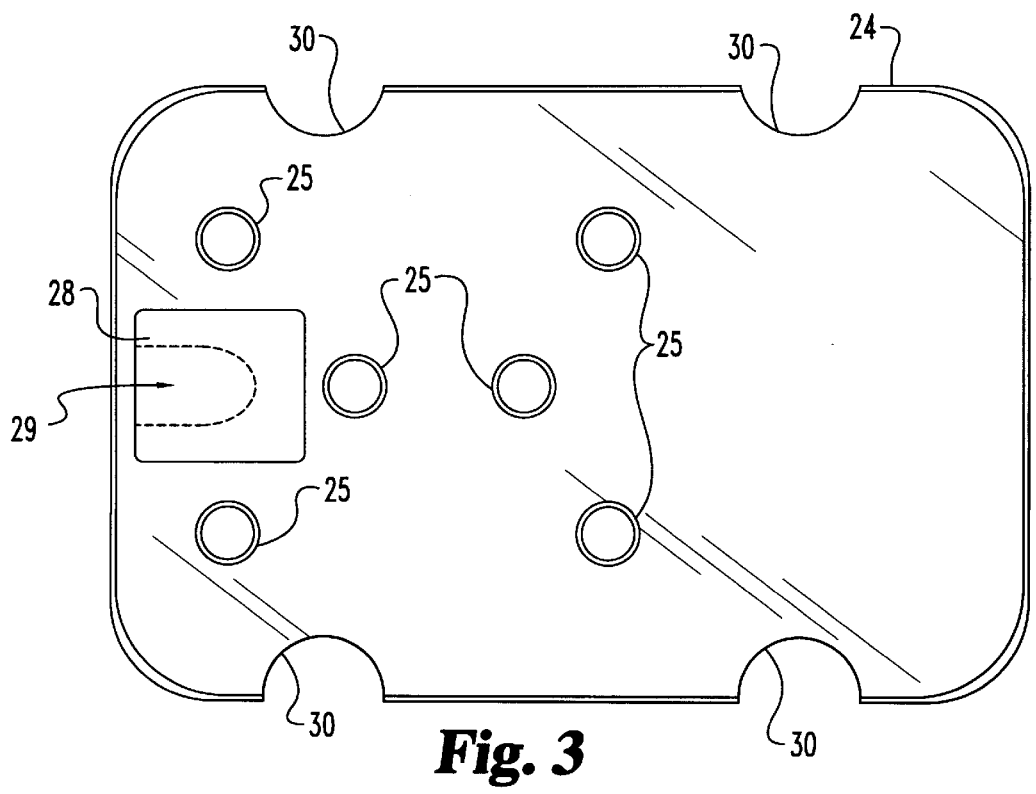
FIG. 3 is a top view of the insert of FIG. 3.

With reference now to the figures, FIG. 1 provides a cross sectional view of a vapor recovery canister 11 of the present invention. Canister 11 includes housing 12 generally defining top and side wall members, and a bottom wall member 13. Housing 12 defines an inlet 14 and an outlet 15 for entry and exit of a gaseous stream, respectively. Housing 12 also includes interior wall 16 dividing the interior of canister 11 into first and second chambers. A gaseous stream entering inlet 14 passes generally in the direction of arrow 17 from the first chamber to the second chamber and out outlet opening 15, as discussed further below.

Canister 11 includes a bed of solid adsorbent 18 such as pelletized carbon positioned in the first chamber, and a similar bed of solid adsorbent 19 positioned in the second chamber. A resilient, gas permeable containment member 20, for example formed of an open-cell foamed synthetic polymer, retains the solid adsorbent beds 18 and 19 at the bottoms of the first and second chambers, and gas permeable filter members 22a and 22b retain the solid adsorbent beds 18 and 19 at the top of the first and second chambers. Filter members 22a and 22b serve to filter impurities from fuel vapor and purge air passing therethrough. Containment members 20 is resilient and thereby exerts, a compacting force on the adsorbent beds 18 and 19 in the completed device. In this regard, it will be understood that other arrangements for maintaining the compaction of the adsorbent beds can be used without departing from the present invention. For example, other biasing means such as springs or the like can be used. Nibs 21 and 23 extend from the top wall of housing 12 generally in the areas of the first and second chambers and serve to evenly distribute fuel vapor and purge air through the solid adsorbent bed, so as to provide a generally open plenum to facilitate the distribution of the gaseous stream into and out of the solid adsorbent beds 18 and 19. Canister 11 also includes a purge opening 26 which is used in a purge cycle for canister 11 as discussed below.

In the illustrated device, bottom wall 13 of canister 11 is formed as a part of the encapsulation for the phase change material. A plurality of elongate hollow members 25 are connected to bottom wall 13, and are adapted to contain a phase change material and maintain the same in heat exchange relationship with solid adsorbent bed 18 in the first chamber. Elongate members 25 can be cylindrical in shape, and can also have modified inner and/or outer surface characteristics, such as corrugations, fins, a star-shaped profile, or the like, to increase the surface area contact with the solid adsorbent and/or the phase change material.

The encapsulation member of the present invention will now be further described with reference to FIGS. 1–4. Bottom wall member 13 is hollow, defining interior chamber 27 (FIG. 4) which communicates with the hollow interior of each of the plurality of cylindrical members 25. Fill port member 28 is attached, preferably integrally formed, on the inside surface of wall member 13. Fill port member defines fill port aperture 29 communicating with interior chamber 27. In this manner, all cylindrical members 25 can be filled with liquid phase change material from single fill port aperture 29, wherein liquid introduced through aperture 29 enters chamber 27 and flows into the interior of each cylindrical member 25, whereafter aperture 29 can be sealed with a glue, resin or the like. The ready manufacture of the preferred overall canister 11 is thereby expedited. Bottom wall 24 includes indentations 30 which allow for the filling of the first and second chambers with solid adsorbent beds 18 and 19 after the encapsulation member is positioned within housing. In this arrangement, the openings created by indentations 30 can be sealed after solid adsorbent filling with a suitable resinous sealant or any other suitable means, e.g. further plate(s) which are attached to seal the openings. Other adsorbent-fill arrangements can of course be used, for example including one or more holes defined in wall 13 which after filling are appropriately sealed.

In use, canister label 11 is fluidly connected via inlet opening 14 to the head space of a fuel tank such that fuel vapors displaced as the tank is filled with liquid fuel pass into opening 14. The fuel vapors pass through adsorbent bed 18, wherein the vapors are condensed to liquid on the carbon surface as they are adsorbed. This adsorption generates heat which is transferred to the phase change material within cylindrical members 25, thus thermally managing solid adsorbent bed 18 to improve its adsorptive capacity. A gaseous stream stripped of fuel vapors passes around wall 16, through compression member 22 so as to traverse adsorbent bed 19 and exit outlet opening 15.

In a purge cycle, a gas (e.g. ambient air) is passed through purge opening 26 and into adsorbent beds 18 and 19, thereby desorbing liquid fuel from adsorbent beds 18 and 19 and passing the same out of outlet opening 15. The passage of gas through adsorbent beds 18 and 19 will tend to have a cooling effect, which reduces the efficiency of desorption. During this operation, positive thermal potential stored in the phase change material during fueling and vapor adsorption is rejected back into the adsorbent beds 18 and 19, thus improving the desorptive capacity of the beds 18 and 19. The desorbed fuel passes around wall member 16, through adsorbent bed 19 and out outlet opening 15. This desorbed fuel can then be routed directly for combustion.

It will be understood that elongate members 25 or other similar elongate members contained in canister 11 can be oriented differently than that illustrated. For example, the elongate members can be oriented perpendicularly to gas flow through canister 11 if desired, either independently supported or formed as a part of a side wall of canister 11.

Figure 5:
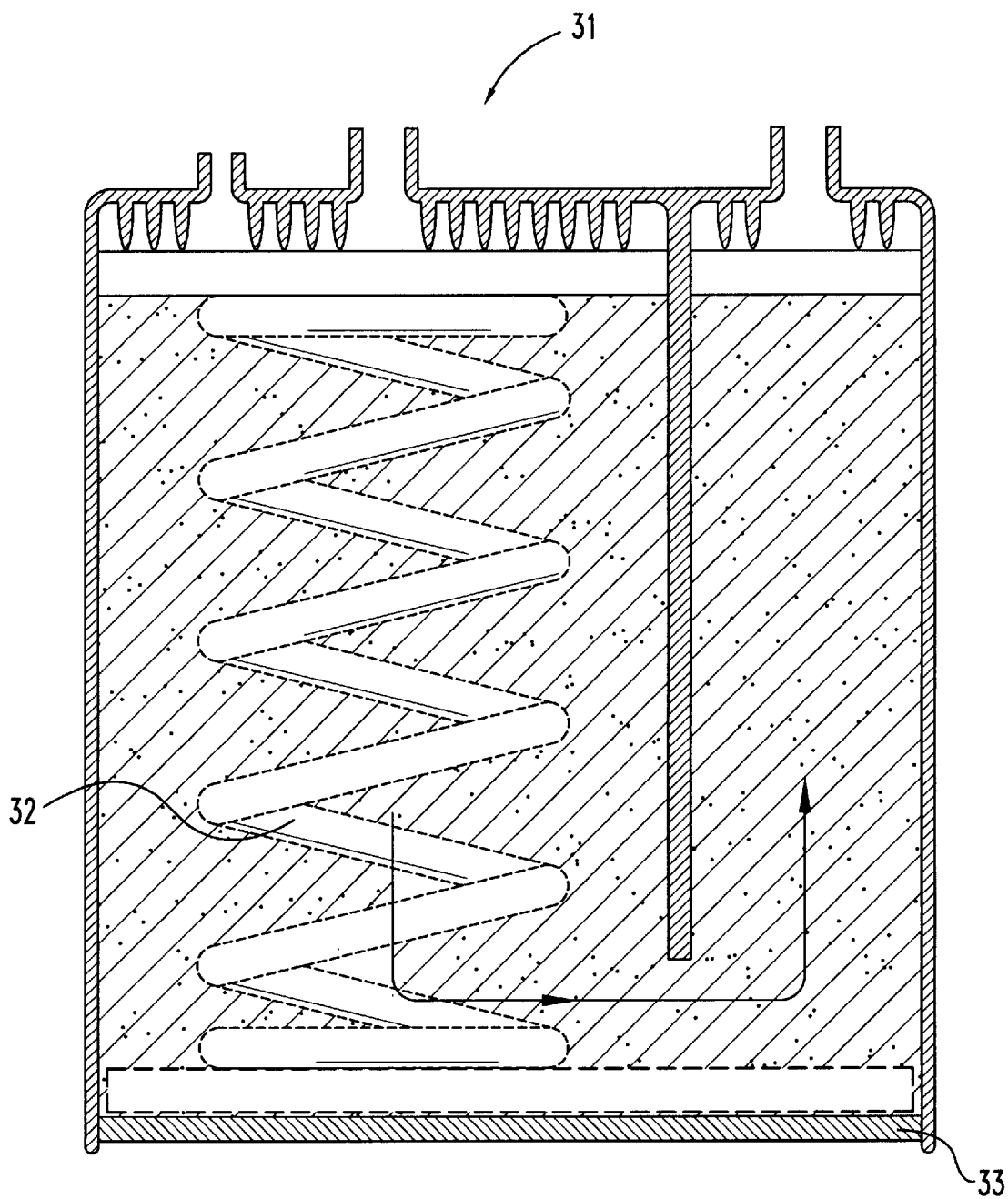
FIG. 5 is a crosssectional view of another vapor recovery canister in accordance with the invention, incorporating a helical encapsulation member.

Referring now to FIG. 5, shown is another vapor recovery canister 31 in accordance with the present invention. Canister 31 is similar in design to canister 11 illustrated in FIGS. 1–4, to which reference may be made for description of the various illustrated components. However, canister 31 includes, instead of cylindrical members 25, a single encapsulation coil 32 filled with phase change material in heat exchange relationship with the adsorbent bed. Thus, wall member 33 of canister 31 need not include a fill port or hollow interior as in the case of device 11 previously described.

Figure 7:
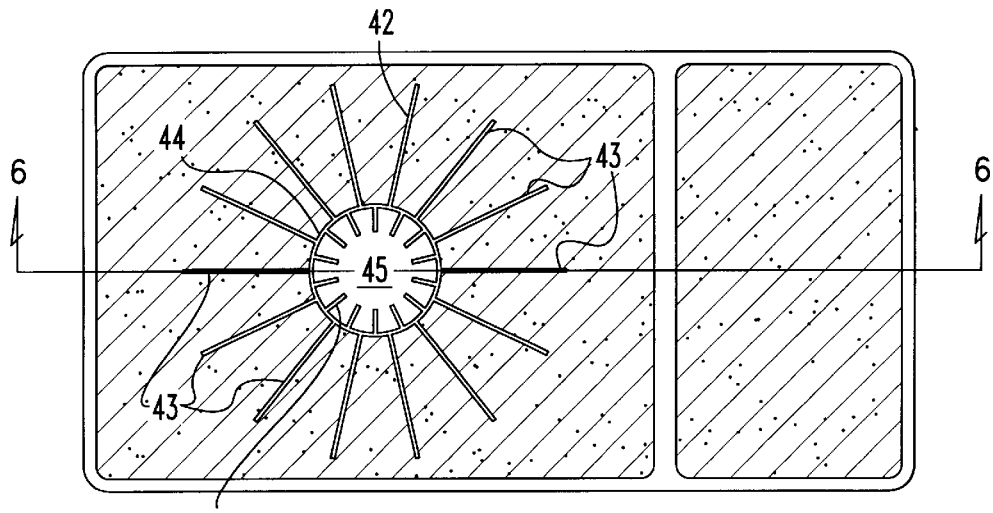
FIG. 7 is a cross-sectional view of the vapor canister of FIG. 6, taken along line 7—7 and viewed in the direction of the arrows.
Figure 6:
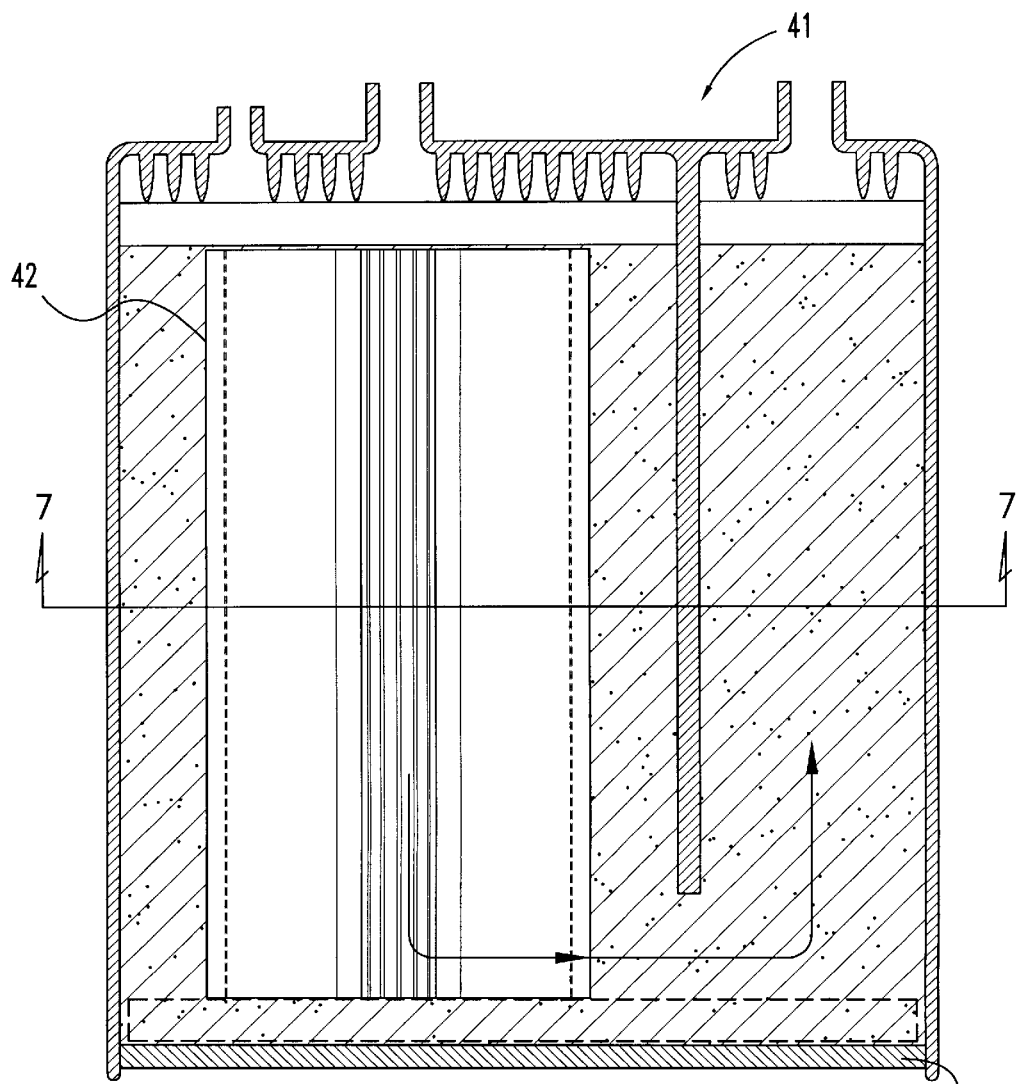
FIG. 6 is a cross-sectional view of another vapor recovery canister in accordance with the invention, incorporating a finned encapsulation member.

With reference to FIGS. 6 and 7, illustrated is another vapor recovery canister 41 of the invention. Canister 41 is also similar in design to canister 11 illustrated in FIGS. 1–4. Canister 41, however, includes a finned encapsulation member 42 filled with phase change material, instead of cylindrical members 25. Finned encapsulation member 42 includes a plurality of thermally-conductive (e.g. metal) fins 43 (FIG. 7), extending radially from the outer surface of cylindrical wall 44 which defines central cavity 45 for housing the phase-change material. Also included are a plurality of thermally conductive (e.g. metal) fins 46 extending radially from the inner surface of wall 44. Thus, the outer surface of wall 44 and the fins 43 and 46 provide surface area for heat-exchange to and from phase change material housed in central cavity 45.

A variety of suitable phase change materials (PCMs) can be used in accordance with the invention. These include for instance those described in U.S. Pat. Nos. 4,272,390; 4,613,444; and 4,412,931, relevant portions of which are hereby incorporated by reference. Such solutions have excellent latent heat characteristics, low electrical conductivity, and outstanding fire retardant capability. Other salt hydrate solutions contemplated as being useful in accordance with the claimed invention include $CaBr_2.6H_2O$ (e.g. as described in U.S. Pat. No. 4,690,769), mixed calcium halide hexahydrates (e.g. as described in U.S. Pat. No. 4,637,888), magnesium nitrate hexahydrate (e.g. as described in U.S. Pat. Nos. 4,272,391; 5,271,029; and 4,273,666), magnesium chloride hexahydrate (e.g. as described in U.S. Pat. Nos. 4,338,208 and 4,406,805), mixtures of magnesium nitrate hexahydrate and magnesium chloride hexahydrate (e.g. as described in U.S. Pat. Nos. 4,272,392; 4,329,242; and 4,402,846), mixtures of magnesium nitrate hexahydrate and ammonium nitrate (e.g. as described in U.S. Pat. No. 4,283,298), gelled PCMs (e.g. as described in U.S. Pat. No. 4,585,572), paraffins, polyethylene glycols, methoxypolyethylene glycols, and other phase change materials. In accordance with the invention the phase change materials may be used alone, or may also be used in combination, e.g. wherein two or phase change materials are included which exhibit differing transition temperatures from one another.

The components of the vapor recovery canisters of the present invention can be constructed of any suitable material, including metals such as copper, aluminum, stainless steel, carbon steel, synthetic polymers, or the like. The components can be manufactured in any suitable fashion, for example molding, machining or forming.

While the invention has been illustrated and described in some detail in the foregoing description and Figures, the same is to be considered as illustrative and not restrictive in character, it being understood that only the preferred embodiments have been illustrated and described and that all changes and modifications that come within the spirit of the invention are desired to be protected.

What is claimed is:

1. A method for adsorbing and collecting an evaporative hydrocarbon, comprising:
   providing a solid adsorbent bed for adsorbing hydrocarbon vapor, said adsorbent bed being in heat-exchange relationship with an encapsulation containing a phase change material;
   passing a gaseous stream including hydrocarbon vapor through said adsorbent bed so as to adsorb the hydrocarbon vapor and generate heat, said heat being transferred to said phase change material; and
   after said passing, purging said adsorbent bed by flowing a gas purge stream therethrough to remove the hydrocarbon from the bed, wherein during said purging, heat is transferred from said phase change material to said solid adsorbent bed.

2. The method of claim 1, wherein the evaporative hydrocarbon is a fuel.

3. The method of claim 2, wherein the solid adsorbent is particulate carbon.

4. The method of claim 3, wherein said encapsulation includes at least one elongate member containing said phase change material.

5. The method of claim 4, wherein said phase change material is a salt hydrate composition.

6. A vapor recovery canister for absorbing fuel vapor, comprising:
   a container having an inlet opening and an outlet opening at spaced positions from one another, for passing a gaseous stream through said container;
   a solid adsorbent contained in said container for adsorbing fuel vapor from said gaseous stream as it is passed through said container; and
   an encapsulation and one or more phase change materials hermetically contained in said encapsulation, said encapsulation being in heat-exchange relationship with said solid adsorbent for removing heat from said adsorbent generated during absorption of said fuel vapor and rejecting heat back to said adsorbent during the desorption of fuel from said adsorbent.

7. The vapor recovery canister of claim 6 wherein:
   said encapsulation includes a plurality of elongate members containing said one or more phase change materials each in heat exchange relationship with the adsorbent.

8. The vapor recovery canister of claim 7 wherein:
   said elongate members are fluidly coupled to a common filling port.

9. The vapor recovery canister of claim 7 wherein:
   said elongate members are attached to a wall member of said container.

10. The vapor recovery canister of claim 7 wherein:
    said elongate members contain a salt hydrate composition.

11. The vapor recovery canister of claim 10 wherein the solid adsorbent comprised particulate carbon.

12. The vapor recovery canister of claim 6 wherein:
    said solid adsorbent comprises particular carbon.

13. The vapor recovery canister of claim 12 wherein:
    said encapsuation includes a plurality of elongate members containing said one or more phase change materials each in heat exchange relationship with the adsorbent, and wherein said elongate members have outer and inner surface means for increasing the surface area of the members in contact with adsorbent.

14. The vapor recovery canister of claim 13 wherein:
    said outer and inner surface means comprise corrugations or fins.

15. The vapor recovery canister of claim 14 wherein:
    said outer and inner surface means comprise fins.

16. The vapor recovery canister of claim 6 wherein:
    said one or more phase change material includes more than one phase change material, wherein each phase change material exhibits a different transition temperature.

17. The vapor recovery canister of claim 16 wherein:
    said encapsulation is adapted to generate a uniform distribution of the gaseous fuel vapor through said adsorbent.

18. The vapor recovery canister of claim 6 wherein:
    said encapsulation comprises a hollow wall member of said container.

19. An apparatus for controlling the emission of fuel vapor during a fueling operation, comprising:
    a fuel tank for containing fuel;
    a vapor recovery canister having an inlet fluidly coupled to said fuel tank for receiving a gaseous stream containing fuel vapor from said tank during a fueling operation;

said vapor recovery canister further having an outlet, and containing a solid adsorbent for adsorbing fuel vapor from the gaseous stream as it is passed from said inlet to said outlet; and said vapor recovery canister also including an encapsulation containing a phase change material in heat-exchange relationship with said solid adsorbent, wherein heat generated during adsorption of fuel vapor is transferred from said solid adsorbent to said phase change material.

20. The apparatus of claim 19, wherein said encapsulation includes at least one elongate member in contact with said solid adsorbent.

21. The apparatus of claim 20, wherein said solid adsorbent is particulate carbon.

22. An encapsulation of a phase change material for use in a vapor recovery canister, comprising:

a wall member having an internal passage;

at least one hollow elongate member attached to said wall member, the interior of said hollow elongate member being fluidly coupled to said internal passage of said wall member;

a fill port defined in said wall member and communicating with said internal passage; and a phase change material contained in said hollow elongate member.

23. The encapsulation of claim 22 wherein:

said phase change material is a salt hydrate composition; and said at least one hollow elongate member includes a plurality of hollow elongate members.

* * * * *